United States Patent [19]
Tillner

[11] Patent Number: 6,048,025
[45] Date of Patent: Apr. 11, 2000

[54] LOCKING ELEMENT FOR A DRAWING-IN ROD FOR THE PROFILE-FORMING CONNECTION BETWEEN UPHOLSTERY COVERING MATERIALS FOR UPHOLSTERY FURNITURE AND SIMILAR UPHOLSTERED PARTS

[76] Inventor: Thomas Tillner, Am Amazonenwerk 44, D-49205 Hasbergen, Germany

[21] Appl. No.: 09/193,532

[22] Filed: Nov. 17, 1998

[30] Foreign Application Priority Data

Mar. 14, 1998 [DE] Germany ............................ 298 04 603

[51] Int. Cl.⁷ ............................ A47C 31/02; A47C 31/11
[52] U.S. Cl. ...................................... 297/218.7; 297/218.2; 297/218.5; 297/452.59; 297/452.6; 24/601.2; 5/402
[58] Field of Search ............................ 297/218.1, 218.2, 297/218.3, 218.5, 452.58, 452.59, 452.6; 24/601.2, 265 H; 5/402, 403, 404, 406

[56] References Cited

U.S. PATENT DOCUMENTS

| | | | |
|---|---|---|---|
| 3,216,029 | 11/1965 | Fritzmeier | 297/218.1 X |
| 3,233,253 | 2/1966 | Cauvin | 297/218.1 X |
| 3,298,743 | 1/1967 | Albinson et al. | 297/218.5 X |
| 3,300,251 | 1/1967 | Helms | 297/218.5 X |
| 3,506,987 | 4/1970 | Bielak | 297/218.1 X |
| 3,630,572 | 12/1971 | Homier | 297/218.1 X |
| 3,981,534 | 9/1976 | Wilton | 297/218.1 |
| 4,865,383 | 9/1989 | Sbaragli et al. | 297/218.2 |
| 5,478,134 | 12/1995 | Bernard et al. | 297/218.1 |
| 5,518,292 | 5/1996 | Cozzani | 297/218.1 X |
| 5,820,213 | 10/1998 | Severinski | 297/218.1 X |
| 5,867,873 | 2/1999 | Arend | 297/218.5 X |
| 5,879,051 | 3/1999 | Cozzani | 297/218.1 X |

*Primary Examiner*—Peter M. Cuomo
*Assistant Examiner*—Rodney B. White
*Attorney, Agent, or Firm*—Jordan and Hamburg LLP

[57] ABSTRACT

A locking device for upholstery is connected between an elongate holding element and an elongate drawing-in element which is connected to a sewing-on flag. The sewing-on flag in turn is connected to upholstery covering material. The locking device includes a one-piece structure having wall parts enclosing two consecutive hollow spaces, one of the hollow spaces receiving the drawing-in element, the other of the hollow spaces receiving the holding element. The wall part enclosing the one hollow space has an insertion slot for inserting the drawing-in element such that the wall part enclosing the one hollow space locks the drawing-in element in the one hollow space.

6 Claims, 4 Drawing Sheets

LOCKING ELEMENT FOR A DRAWING-IN ROD FOR THE PROFILE-FORMING CONNECTION BETWEEN UPHOLSTERY COVERING MATERIALS FOR UPHOLSTERY FURNITURE AND SIMILAR UPHOLSTERED PARTS

BACKGROUND OF THE INVENTION

The invention relates to a locking element for a plastic drawing-in rod for the profile-forming connection between upholstery covering materials, with a rope-shaped holding element on the upholstery side, for upholstered furniture and similar upholstered parts, such as seat parts and back parts.

For upholstered furniture and similar upholstered parts, such as seat parts and back parts particularly of automobile seats, drawing-in rods are used for the purpose of bringing the upholstery material, usually a foam material, the outside of which is covered by a covering material and which is mounted on a suitable backing, into a desired shape appropriate for the seat. For this, the covering material is sewn to the sewing-on flag of the drawing-in rod and the drawing-in rod, so prepared, is pulled through a material slot essentially transversely to the outer surface of the covering material lying on the upholstery material into the upholstery material and fixed, as a result of which a seam-like, so-called blind tacking with appropriate profiled curvatures is produced on either side of the blind tacking.

For fixing the drawing-in rod in the upholstery material, the use of C-shaped metal clips as locking elements is known, one end of which engages the drawing-in rod and the other the rope-shaped holding element on the upholstery side, usually a metal wire fastened in the upholstery substructure. The inner side of one of the two end legs of the C-shaped profile forms a seat for the rope-shaped holding element on the upholstery side, while the other end leg of the C-shaped profile engages a bushing opening incorporated in the drawing-in rod at the respective, required connecting site.

In practice, this known type of connection between the drawing-in rod and the holding element on the upholstery side turns out to be time consuming and work intensive to a high degree and, in addition, requires more material for the drawing-in rod. This is due to the fact that, before the drawing-in rod is inserted into the upholstery material at the connection sites, which change with different applications, bushing openings must be incorporated in the appropriately massive drawing-in rod, which is dimensioned sufficiently large to accommodate the metal clips as locking elements. Moreover, for connecting the metal clips to the drawing-in rod, heavy, usually pneumatically operated special locking pliers are required, which frequently can be handled only with difficulty under the given space conditions.

SUMMARY OF THE INVENTION

It is therefore an object of the invention to provide a locking element for a plastic drawing-in rod for the profile-forming connection between an upholstery covering material and a holding element, which is rope-shaped on the upholstery side, which locking element is suitable, with little time and effort and without requiring additional material for the drawing-in rod, to bring about the connection of this rod with the rope-shaped holding element on the upholstery side.

The inventive locking element accordingly is formed from a plastic one-piece molded object, preferably an injection molded object, which can be connected with little time and effort with the drawing-in rod as well as with the rope-shaped holding element on the upholstery side.

As material for the molded object forming the locking element, all suitable thermoplastic materials, particularly polypropylene, come into consideration. Molded objects, produced from such plastics, have wall parts exhibiting a high degree of elasticity and a correspondingly elastic restoring capability, so that, with appropriately contoured connecting parts, a snap fastener-like locking connection can be brought about herewith simply, in a known manner, without the use of heavy, special connecting tools with a power drive.

By these means, one of the two hollow spaces of the inventive locking element, which forms the space accommodating the rope-shaped holding element, can be brought into engagement with little expenditure of force, that is by hand, with the rope-shaped holding element, such as a metal wire. The same is true also for the other one of the two hollow spaces of the inventive locking element, which forms a locking opening for a locking connection with the drawing-in rod. At the drawing-in rod itself, there is no need to provide any connecting openings in a grid corresponding to the intended connecting sites. This simplifies the installation process substantially. Accordingly, less material is required to produce the drawing-in rod. The locking engagement between the drawing-in rod and the locking elements at the individual connecting sites provided conveniently along the length of the drawing-in rod is brought about particularly easily owing to the fact that the introduction into the locking opening takes place over a lateral insertion slot, that is, that the introducing rod for producing the locking engagement with the locking opening is pushed through the insertion slot in a direction perpendicular to the central plane of division of the molded object.

With the drawing-in rod, the inventive locking element accordingly forms an apparatus, which is also covered by the invention, consists of plastic and is intended to form a profile of upholstery material, which is covered on the outside by a covering material, consists particularly of a foam material, can be processed easily, offers a secure hold for the drawn-in upholstery covering material and, in other respects, can also be disposed of together with the foam material as a product with materials of the same type.

Further distinguishing features and advantages of the invention arise out of the dependent claims and the specification below in conjunction with the drawing, in which two examples of the object of the invention are illustrated diagrammatically.

IN THE DRAWINGS

FIG. 1 shows a front view of a locking element of a first example of the invention in an instantaneous state during its locking with a drawing-in rod, FIG. 2 shows a representation corresponding to FIG. 1, the locking element, however, being shown in the state in which it is locked with the drawing-in rod, FIG. 3 shows a side view of the locking element in the locked state of FIG. 2, only an end region of the drawing-in rod being shown, FIG. 4 shows a section along the line IV—IV of FIG. 3 on a larger scale and in conjunction with an upholstered part, a section of which is shown, and FIGS. 5 to 8 show representations corresponding to FIGS. 1 to 4 to illustrate a further example of the inventive locking element.

DESCRIPTION OF THE PREFERRED EMBODIMENTS

Figure 1:
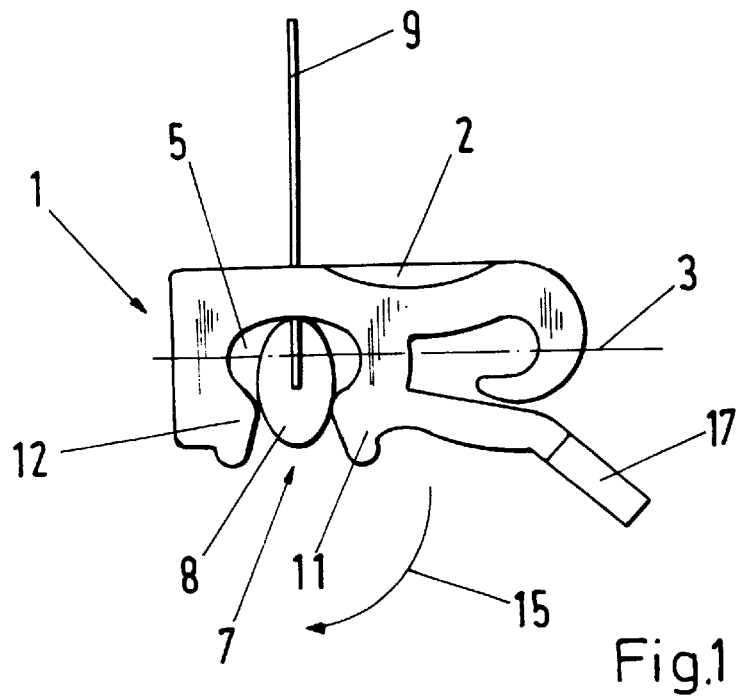

The locking element, which is labeled 1 as a whole in the drawing, is formed from a one-piece object 2 molded from a thermoplastic material, such as polypropylene. On either side of a central plane of division 3, the wall parts of the molded object 2 enclose two consecutive hollow spaces 4 and 5. The hollow space 4 forms a space for accommodating a rope-shaped holding element 6 (FIG. 4), which is fixed in the substructure of the upholstered part in a manner, the details of which are not shown. The other hollow space 5 forms a locking opening, which is accessible over a lateral insertion slot 7 and is intended for a locking connection with a drawing-in rod 8, which in turn consists of a plastic, such as polypropylene, and is formed from a one-piece extruded profiled rod.

Between two legs of the drawing-in rod 8, a sewing-on flag 9, which extends over the length of the drawing-in rod 8 along its edge, is welded to the drawing-in rod 8. The sewing-on flag 9 consists of a strip of nonwoven material, of a wide-meshed fabric or of a similar textile material, which is based on a plastic, which can be readily welded to the drawing-in rod.

The accommodating space 4 and the locking opening 5 are separated from one another by a transverse cross member 10 of the molded object 2, the locking opening 5 being provided with a cross section adapted to the profile of the drawing-in rod 8. In the example shown, the cross section of the locking opening 5 and the cross-sectional profile of the profiled rod 8 have a basic oval shape, the sewing-on flag 9 being disposed in the extension of the longitudinal center line of the oval. Basically, other suitable profile shapes, such as a round profile or a rectangular profile or a flat box profile or combinations of these profiles can take the place of the basic oval shape of the cross-sectional profile of the drawing-in rod 8.

Preferably, however, the cross section of the locking opening 5 in every case has an oblong shape extending longitudinally along the central plane of division 3 and, accordingly, a lesser transverse extent perpendicular to the plane of division 3 for accommodating an appropriately contoured drawing-rod 8. Moreover, the insertion slot 7 has a width, which corresponds to the largest transverse extent of the locking opening 5 to the central plane of division 3.

The insertion slot 7 is bounded by wall parts 11, 12, which expand elastically when the drawing-in rod 8 is being inserted and, at the end of the insertion movement of the drawing-in rod 8 into the locking opening 5, automatically return into their starting position because of the elastic restoring capability. To facilitate the introduction of the drawing-in rod 8 into the insertion slot 7, the surface of the expandable wall parts 11, 12, forming the boundary of the insertion slot 7, is constructed funnel-shaped, diverging to the outside. The introduction of the insertion of the drawing-in rod 8 into the insertion slot 7 is furthermore facilitated owing to the fact that the expandable wall parts 11, 12 are extended toward the outside by protruding wall projections 13.

Figure 2:
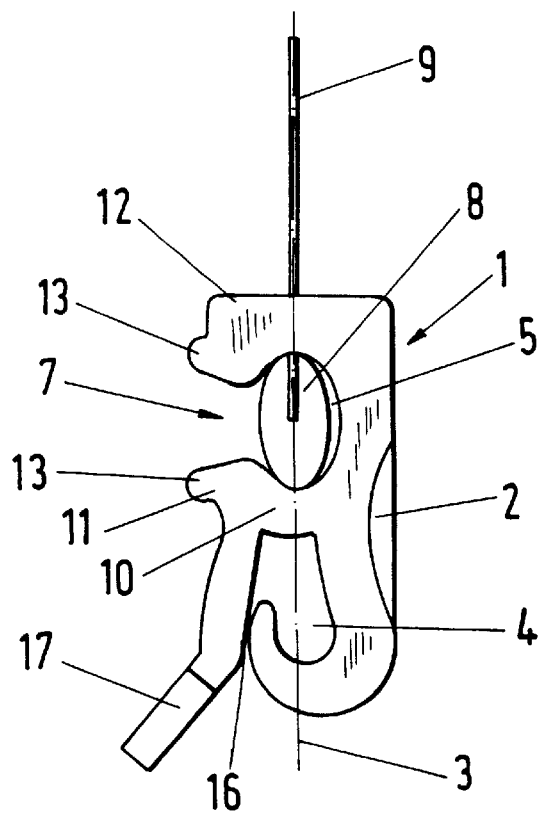

To bring about the locking connection between the drawing-in rod 8 and the locking opening 5, the locking element 1 is inserted with a leading wall part 12 through an opening 14 (FIG. 3) stamped out of the sewing-on flag 9 at the intended connecting site, so that the insertion slot 7, facing the drawing-in rod 8, reaches an alignment, in which the longitudinal extent of the drawing-in rod 8 is perpendicular to the central plane of division 3 of the locking element 1 so that, when an insertion pressure is exerted on the drawing-in rod 8 and/or the locking element 1 to produce the locking engagements between the drawing-in rod 8 and the locking opening 5, the drawing-in rod 8, with its transverse dimension adapted to the width of the insertion slot 7, is moved with elastic expansion of the wall parts 11, 12 through the insertion slot 7, this instantaneous state being illustrated in FIG. 1. By a subsequent rotation of the locking element 1 through 90° corresponding to the arrow 15, the locking element 1 reaches the position of FIG. 2, in which the drawing-in rod 8 is securely locked in the locking opening 5, since the wall parts 11 and 12 have returned elastically into their starting position.

Aside from a narrow opening gap 16, the accommodating space 4 is closed off normally by the wall parts of the molded object 2 surrounding it. The opening gap 16 is overlapped by the profiled leg 17, which is integrally molded in one piece to the molded object 2 and can be bent elastically towards the outside for introducing the holding element 6 into the accommodating space 4.

Figure 3:
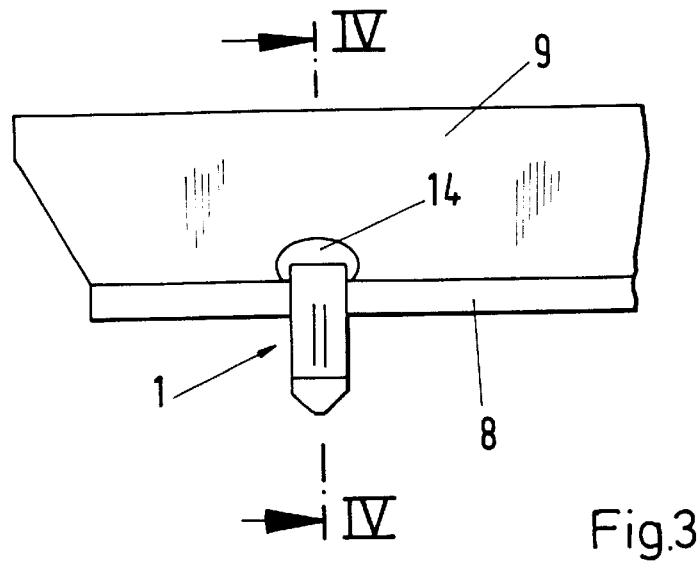

For the example of FIGS. 1 to 4, the profiled leg 17 is at the side of the molded object 2 having the lateral insertion slot 7 to the locking opening 5, that is, on this side of the central plane of division 3. Moreover, the profiled leg 17 is aligned away from the locking opening 5 and, as can be seen from FIG. 3, is pointed at its free end, which facilitates the insertion into the foam material 18 (FIG. 4), which is usually used as upholstery material, during the connection of the locking element 1, which is locked together with the drawing-in rod 8, with the holding element 6 on the upholstery side.

Figure 4:
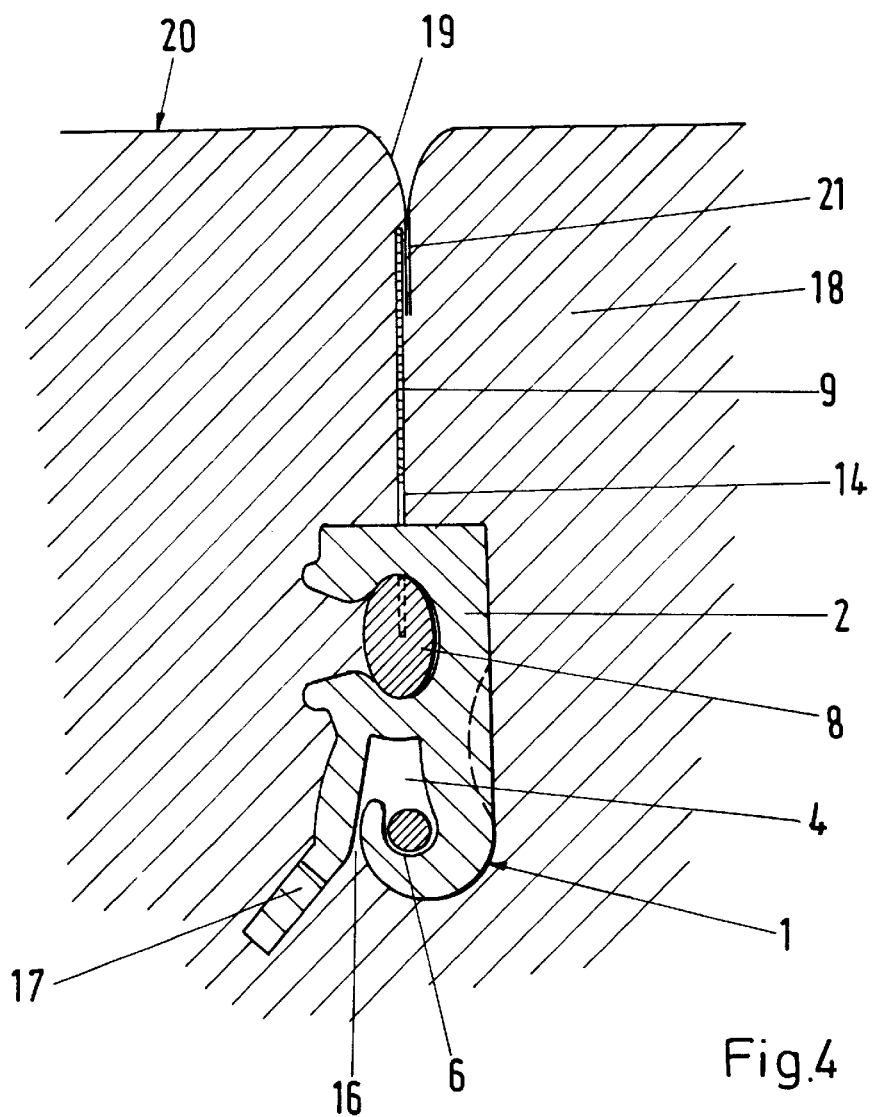
Figure 5:
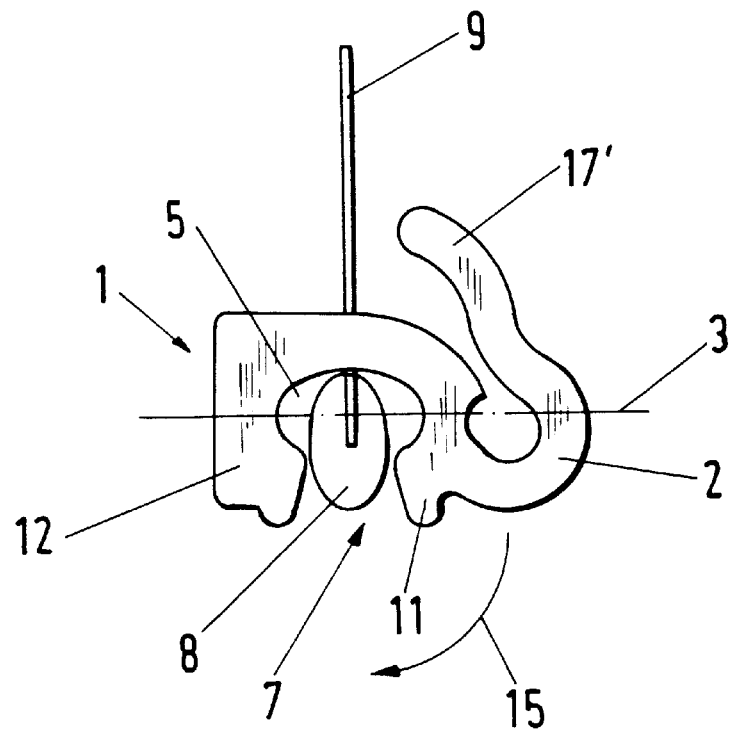
Figure 6:
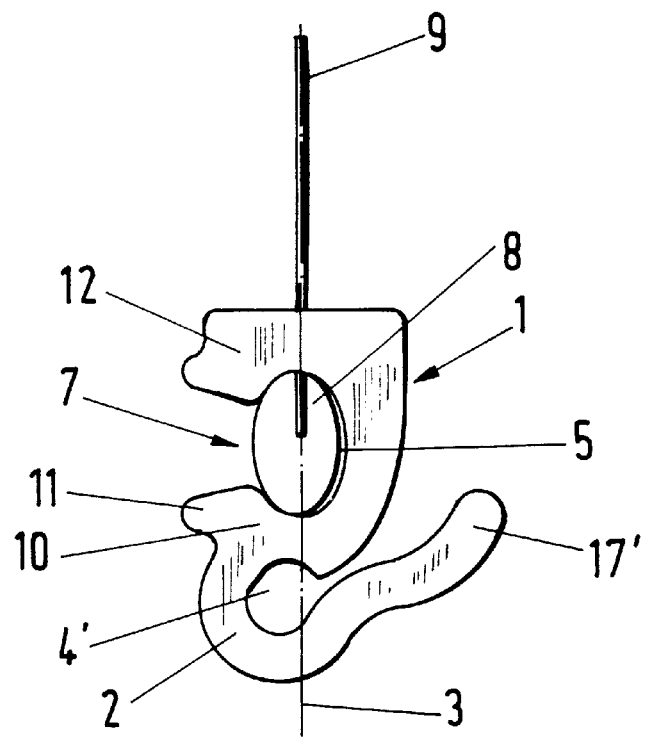
Figure 7:
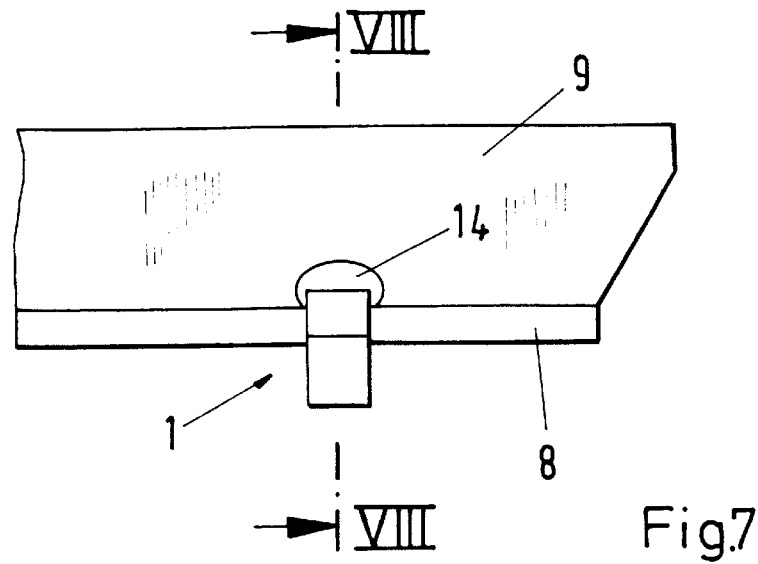

From FIG. 4, which shows the drawing-in rod 8 in the state, in which it is anchored in the upholstery material 18 of an upholstered part, a V-shaped drawn-in region 19 of an upholstery covering material 20 can be seen, which is sewn to the sewing-on flag 9 at 21. The V-shaped drawing-in of the upholstery covering material 20 takes place when the locking element 1 is pressed onto the holding element 6 on the upholstery side through the opening gap 16, the profiled leg 17 being expanded elastically towards the outside and, after the holding element 6 has penetrated into the accommodating space 4, returning elastically into its initial position, which can be seen in FIG. 4. In this position, the holding element 6 is caught reliably in the accommodating space 4 of the locking element 1. By means of the drawing-in process, the desired profiled curvatures in the upholstery are formed on either side of the V-shaped region 19.

In the example of FIGS. 5 to 8, the version selected for the locking opening 5 and the insertion slot 7 is the same as that selected for the first example. Only the accommodating space 4' for the holding element 6 on the upholstery side is formed differently owing to the fact that the profiled leg 17' is formed on the side of the molded object 2 opposite to the lateral insertion slot 7 to the locking opening 5, that is, on the other side of the central plane of division 3, and is aligned towards the locking opening 5.

Figure 8:
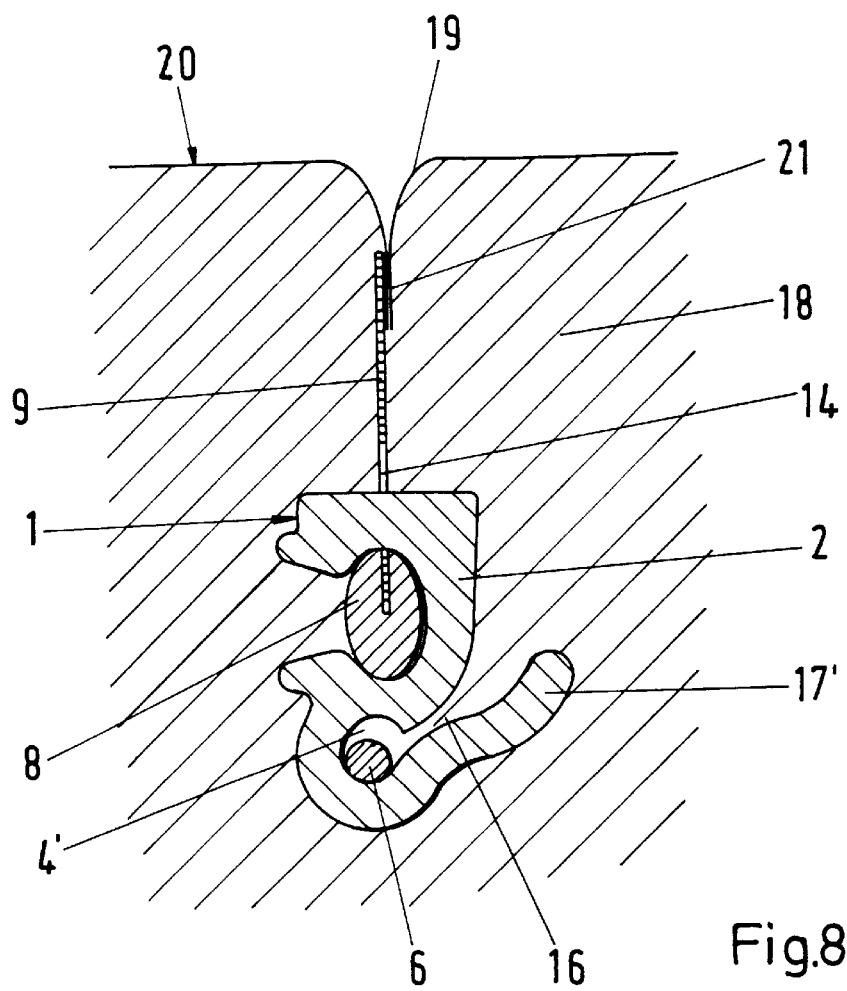

For the example of FIGS. 1 to 4, the locking element 1 engages the holding element 6, as described, by virtue of the fact that the drawing-in rod 8 with its locking element 1 is pressed onto the holding element 6. On the other hand, for the embodiment of FIGS. 5 to 8, this engagement is brought about by a tensional movement of the locking element 1 of the drawing-in rod 8, directed towards the upholstery material 20. The holding element 6 initially is taken hold of in the expanded insertion jaws between the profiled leg 17' and the molded body 2 and, as the tensile movement progresses and the opening gap 16 expands elastically, reaches the accommodating space 4', in which it is locked again securely after the profiled leg 17' returns elastically into its initial position. This connecting state is shown in FIG. 8.

What is claimed is:

1. An upholstery device for connecting a holding element and a drawing-in element comprising, a one-piece structure having first wall parts enclosing a first hollow space for receiving the drawing-in element and for locking the drawing-in element in said one hollow space, said first wall parts having an insertion slot for inserting the drawing-in element into said first hollow space, said one-piece structure including first and second wall regions which define said insertion slot, said first and second wall regions being flexible to enable expanding of the insertion slot for inserting the drawing-in element through said insertion slot into said first hollow space, said insertion slot having outer end portions, said first and second wall regions diverging from one another as said outer end portions are approached, said one-piece structure including a main part, said outer end portions of said insertion slot forming protrusions protruding from said main part, said one-piece structure having second wall parts enclosing a second hollow space for receiving the holding element.

2. An upholstery device for connecting a holding element and a drawing-in element comprising, a one-piece structure having first wall parts enclosing a first hollow space for receiving the drawing-in element and for locking the drawing-in element in said one hollow space, said first wall parts having an insertion slot for inserting the drawing-in element into said first hollow space, said one-piece structure including first and second wall regions which define said insertion slot, said first and second wall regions being flexible to enable expanding of the insertion slot for inserting the drawing-in element through said insertion slot into said first hollow space, said insertion slot having outer end portions, said first and second wall regions diverging from one another as said outer end portions are approached, said one-piece structure having second wall parts enclosing a second hollow space for receiving the holding element, said one-piece structure having third and fourth wall regions surrounding said second hollow space, said third and fourth wall regions having opposed sections juxtaposed to one another, said opposed sections being flexible to enable movement of said opposed sections relative to one another to thereby provide a gap between said opposed sections for enabling access of the holding element to said second hollow space, said one-piece structure having a projecting leg extending from one of said opposed sections, said projecting leg being adapted to be grasped to facilitate flexing of said one opposed section to form said gap.

3. A locking device according to claim 2 wherein said one-piece structure has a central plane passing generally centrally through said two consecutive hollow spaces, said projecting leg and said insertion slot being disposed on one side of said central plane.

4. A locking device according to claim 3 wherein said projecting leg extends away from said insertion slot.

5. A locking device according to claim 2 wherein said one-piece structure has a central plane passing generally centrally through said two consecutive hollow spaces, said projecting leg and said insertion slot being disposed on opposite sides of said central plane.

6. A locking device according to claim, 5 wherein said projecting leg extends away from said central plane.

* * * * *